Feb. 14, 1967 W. D. HUFFAKER 3,304,127
MATERIAL HANDLING APPARATUS
Filed Aug. 20, 1965
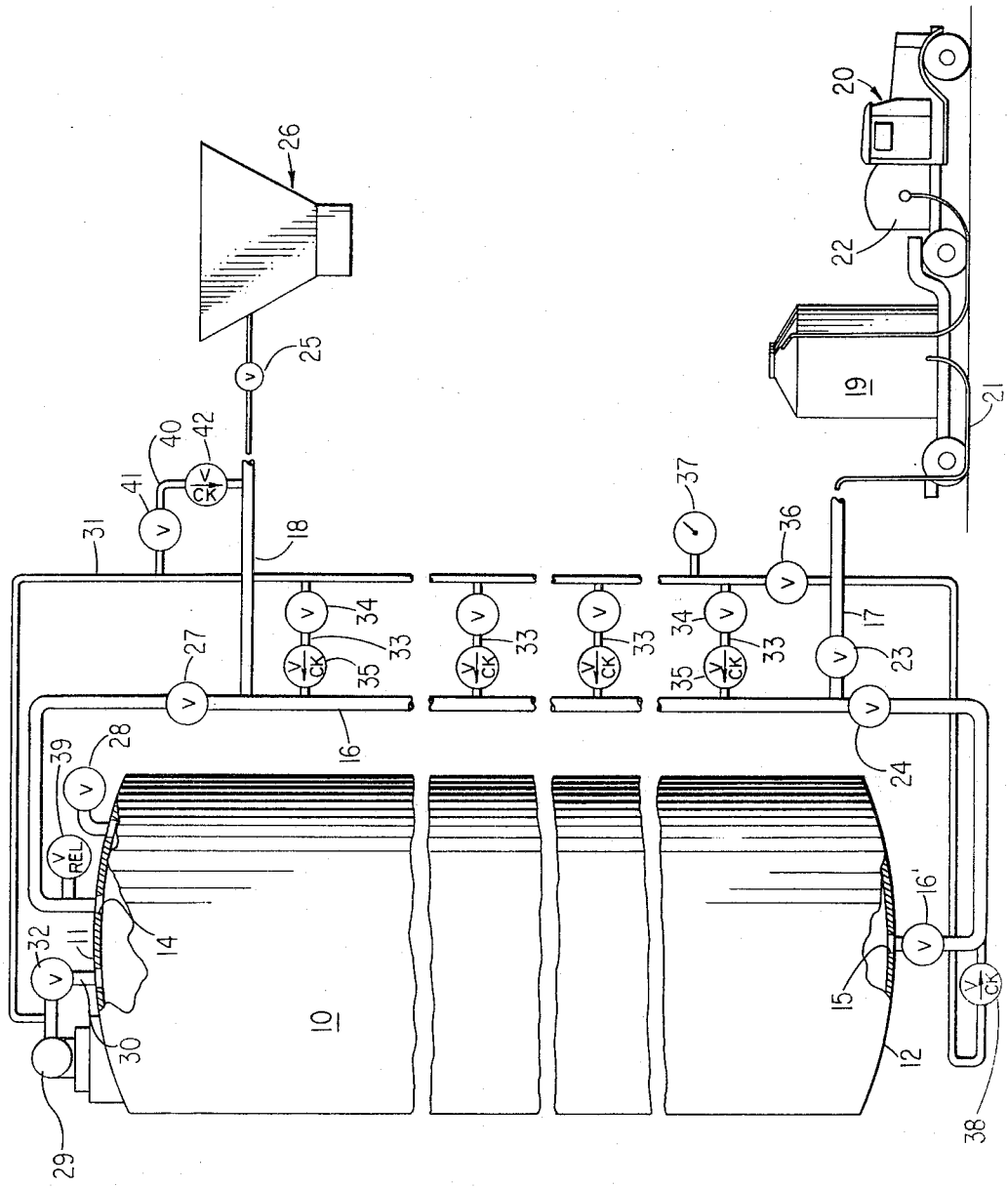
INVENTOR
WALTER D. HUFFAKER
BY Robert Cerera
ATTORNEY

United States Patent Office 3,304,127
Patented Feb. 14, 1967

3,304,127
MATERIAL HANDLING APPARATUS
Walter D. Huffaker, Atlanta, Ga., assignor to Ma-Tran Corp., Atlanta, Ga., a corporation of Georgia
Filed Aug. 20, 1965, Ser. No. 481,374
18 Claims. (Cl. 302—28)

This invention relates to a material handling apparatus and, more particularly, to a material handling apparatus utilizing a gas to convey or transport material through a closed system.

When employing a material handling apparatus in which material is transported or conveyed from a storage tank or container to a mixing or weighing hopper or the like, it has been necessary to stop delivery of the material from the storage tank or container to the hopper whenever the supply of material within the storage container must be replenished. Thus, filling of the trucks, bags, or the like in which the material is transported from the mixing or weighing hopper or the like must be halted. Depending on the volume of the storage container and the volume of the supply container, the downtime for filling the storage container or tank may be substantial whereby the cost of labor creates a substantial expense. Furthermore, if the material is being transported from the hopper to a construction area where a large number of employees is waiting for the material such as when pouring concrete or laying asphalt, for example, the delay can cause further increased labor expense.

The present invention satisfactorily solves the foregoing problem by utilizing a structure wherein the storage container may be filled while material is being simultaneously supplied to the mixing or weighing hopper or the like. With the arrangement of the present invention, the increased labor expense due to the down-time of the hopper or the like is eliminated.

Some prior pneumatic closed systems for transporting material from a storage container to a mixing or weighing hopper or the like have employed a high pressure within the container in order to transport or convey the material through the lines or conduits without creating clogging thereof. This has resulted in the necessity of a storage container or tank capable of withstanding high pressures; of course, this has created a high initial equipment expense. The present invention satisfactorily eliminates this initial high cost for a storage container capable of withstanding high pressures by utilizing a relatively low pressure within the container to force the material therefrom.

The present invention eliminates the need for a high pressure container or tank by supplying pressurized gas into the lines connecting the container or tank with the mixing or weighing hopper or the like. It has previously been suggested to add air to the conveying or transporting line from the container or tank. However, this additional air has been employed only to prevent clogging of the line and does not permit the use of substantially low pressure within the storage container or tank. Furthermore, in this type of arrangement wherein air is added to the conveying conduit or line after it leaves the storage container, the stopping of the flow of material from the storage container results in the possibility of the line being clogged or blocked. The present invention satisfactorily solves this problem by using the gas to clear the line whenever flow of material therethrough is stopped.

Accordingly, an object of this invention is to provide a material handling apparatus in which material may be simultaneously loaded in a storage container or tank and supplied to a hopper or the like from a single source.

Another object of this invention is to provide a material handling apparatus in which the required pressure within the storage container is relatively low.

A further object of this invention is to provide a pneumatic conveying system in which the supply line or conduit from the storage container or tank is automatically cleared of material when material is no longer being moved therethrough.

Still another object of this invention is to provide a closed system for both loading material in a storage container or tank and removing the material from the container or tank.

Other objects of this invention will be readily perceived from the following description, claims, and drawing.

This invention relates to a pneumatic material handling system including a storage container having a discharge line communicating therewith. The system has means to simultaneously supply material to the storage container and the discharge line from a source of material. The system also has means to supply the material from the storage container to the discharge line when the simultaneous supply means is inactivated.

This invention also relates to a material handling apparatus including a storage container having an inlet and an outlet. The inlet is connected to one end of a first line, which has its other end connected to the outlet. The first line is connected to a supply line, which is adapted to be connected to a source of material under pressure, and a discharge line. First means controls flow of material through the supply line to the first line, and second means controls flow of material from the first line through the discharge line. The flow of material through the first line between the supply line and one of the ends of the first line is controlled by third means, and the flow of material through the first line between the discharge line and the other end of the first line is controlled by fourth means. When the first control means is open and one of the third and fourth control means is open and the other closed, the storage container is vented by suitable means whereby material may be supplied through the inlet to the storage container from the supply line. Gas under pressure is supplied by suitable means to the inlet end of the storage container only when the first control means is closed, the second control means is open, and one of the third and fourth control means is open and the other is closed whereby the material is directed from the storage container through the outlet and the first line to the discharge line. Means supply gas under pressure to the first line adjacent its connection to the outlet of the storage container only when the first control means is closed and the third and the fourth control means are open to clear the first line of material therein.

This invention further relates to a material handling apparatus including a storage container having an inlet and an outlet. The inlet is connected to one end of a first line, which has its other end connected to the outlet. The first line is connected to a supply line, which is adapted to be connected to a source of material under pressure, and a discharge line. The flow of material through the supply line to the first line is controlled by first means, and the flow of material from the first line through the discharge line is controlled by second means. Third means controls flow of material through the first line between the supply line and one of the ends of the first line, and fourth means controls flow of material through the first line between the discharge line and the other end of the first line. When the first control means is open and one of the third and fourth control means is open and the other is closed, the storage container is vented by suitable means whereby material may be supplied through the inlet to the storage container from the supply line. The apparatus includes a compressor, which is connected to the inlet end of the container by a line. Suitable means allow pressurized gas to flow through the line from the compressor into the storage container only when the first control means is closed, the second control means is open, and one of the third and fourth control means is open and the other is closed whereby material is directed from the storage container through the outlet and the first line to the discharge line.

The attached drawing illustrates a preferred embodiment of the invention in which the single figure is a schematic elevational view, partly in section, of the material handling apparatus of the present invention.

Referring to the drawing, there is shown a storage container or tank 10, which is preferably of cylindrical shape. The storage container 10 has a curved or arcuate upper end 11 and a curved or arcuate lower end 12. While the container or tank 10 is shown in a vertical position, it should be understood that it may be positioned horizontally if desired. Furthermore, the configuration of the container or tank 10 may be other than cylindrical if desired.

The upper end 11 has an inlet 14 through which material may be supplied to the container or tank 10. The lower end 12 of the container 10 has an outlet 15 through which material may be dispensed from the container 10. It should be understood that the upper and lower ends may have a shape other than curved or arcuate such as conical, for example, if desired. It is only necessary that the lower end 12 be capable of enabling all of the material to flow out of the container 10 through the outlet 15.

A conduit or line 16, which is disposed exteriorly of the container 10, connects the inlet 14 of the container 10 with the outlet 15 of the container 10. A valve 16' controls communication of the outlet 15 with the line 16.

A supply line 17 is connected to the line 16 closer to its connection to the outlet 15 of the container 10 than to the inlet 14. A discharge line or conduit 18 is connected to the conduit or line 16 closer to the inlet 14 of the container 10 than the outlet 15. It is not necessary that the supply line 17 and the discharge line 18 be connected adjacent the ends of the line 16 as shown since the connections could be reversed if desired.

The supply line 17 is adapted to be connected to a source of material whenever it is necessary to replenish the supply of the material in the storage container 10. One example of a supply source of the material is a container or tank 19 on a delivery truck 20. A conduit or line 21 extends from the tank 19, which has the material therein, and is connected to the supply line 17. The truck 20 has a compressor 22 thereon to supply air under pressure to the tank 19 to deliver the material from the tank 19 through the line 21 into the supply line 17.

The supply line 17 has a normally closed valve 23 disposed therein for controlling the flow of material through the supply line 17. When it is necessary to supply the material from the container or tank 19 on the delivery truck 20 to the storage container 10, the valve 23 is opened to allow the material to flow therethrough. In order to insure that the material flowing through the supply line 17 enters the inlet 14 of the container 10 rather than the outlet 15, a valve 24 is disposed in the line 16 between the connection of the supply line 17 to the line 16 and the value 16'.

Since the discharge line 18 communicates with the line 16 between the closed valve 24 and the inlet 14 of the container 10, the material flowing through the line 16 from the supply line 17 also will flow into the discharge line 18. The flow of material through the discharge line 18 is controlled by a valve 25 disposed therein. If the valve 25 is open, the material flows from the line 16 through the discharge line 18.

A weighing or mixing hopper 26 or the like is connected to the discharge line 18 to receive the material flowing therethrough. The material, which enters the hopper 26, is then dispensed therefrom into a truck, a bag, or other suitable container. Furthermore, when the hopper 26 functions as a mixing hopper, other material is added to the hopper 26 to mix with the material being supplied through the discharge line 18. The amount of material flowing into the hopper 26 is regulated by an operator at the hopper controlling the valve 25.

The material flowing from the supply line 17 into the line 16 also flows into the interior of the container 10 through the inlet 14. The compressor 22 on the truck 20 supplies the material under pressure so that it will pass through the line 16 into the container 10 and the discharge line 18.

A valve 27 is disposed in the line 16 between the discharge line 18 and the inlet 14 of the container 10. This valve 27, which blocks the line 16 when it is closed, is open when the material is being supplied to the container 10 from the supply line 17.

A valve 28 is mounted on the upper end 11 of the container 10. When the valve 28 is opened, the interior of the container 10 is vented to the atmosphere. When the material is being supplied into the container 10 from the supply line 17, the valve 28 is open to eliminate any pressure greater than atmosphere existing within the container 10. Thus, the material is more easily supplied to the container 10 because of the low pressure therein.

A compressor 29 is mounted on the upper end 11 of the tank 10. A discharge line 30 connects the outlet of the compressor 29 with the interior of the container 10. A gas conduit or line 31 extends from the discharge line 30 to the end of the line 16 adjacent its connection to the outlet 15 of the container 10 but beyond the valve 16'.

A valve 32 is disposed in the discharge line 30 between its connection with the line 31 and the interior of the container 10. When the valve 32 is closed, the compressor 29 cannot supply pressurized air to the interior of the container 10. However, it still supplies air to the line 31 even when the valve 32 is closed.

A plurality of lines or conduits 33 connects the air line 31 with the material line 16. When the line 16 is three inches in diameter, the lines are preferably spaced four to eight feet from each other.

Each of the lines 33 has a first valve 34 therein to control flow of air from the line 31 to the line 16. Each of the lines 33 has a second valve 35 therein and closer to the line 16. The second valve 35 is a check valve, which permits only flow of air from the line 31 to the line 16 while preventing flow of material or air from the line 16 to the line 31.

Opening of one or more of the valves 34 results in pressurized air from the line 31 flowing into the line 16 to aid in moving the material therethrough. The volume of air flowing from the line 31 to the line 16 is determined by the number of the valves 34 that are open. Thus, the amount of air pressure being supplied to the line 16 to aid in moving the material therethrough increases with an increase in the number of the valves 34 that are opened.

When the material is being supplied to the container 10 from the supply line 17, a valve 36, which is disposed in the line 31 beneath the connection of the lowermost of the lines 33 to the line 31, is closed. A pressure gauge 37 communicates with the line 31 between the compressor 29 and the valve 36 to indicate the pressure of the air therein.

The closing of the valve 36 prevents the pressurized air in the line 31 from flowing into the line 16 through a check valve 38, which is disposed in the line 31 adjacent its connection to the line 16. When the valve 36 is open, pressurized air flows through the check valve 38 into the line 16 to clear the line of any material therein. The valve 36 is opened only after filling of the container 10 is completed or when transfer of material from the container 10 to the hopper 26 is completed.

A relief valve 39 communicates with the interior of the container 10 through the line 16 and the inlet 14. The relief valve 39 is set to vent the interior of the container 10 whenever pressure within the container 10 reaches a selected value so that the pressure within the container 10 will not be greater than desired. This is only necessary when the valve 32 is open to allow pressurized air to be supplied to the container 10 from the compressor 29. This occurs only when material is being transported from the storage container 10 to the hopper 26 through the discharge line 18.

A line 40 connects the pressurized air line 31 with the discharge line 18. A valve 41 is disposed in the line 40 to open or close the line 40 to control flow of air from the line 31 to the discharge line 18. When the valve 41 is open, the air flows into the discharge line 18 to aid in moving the material along the discharge line 18. A check valve 42 is disposed in the line 40 between the valve 41 and the discharge line 18 to prevent communication from the discharge line 18 to the line 31 while allowing air to flow from the line 31 to the discharge line 18. While only one of the lines 40 has been shown, it should be understood that more than one of the lines 40 may be employed if desired. This would depend upon the length of the discharge line 18 since a long line requires more supplemental air to move the material therethrough.

Considering the operation of the present invention, the valves 24 and 32 are closed and the valves 23 and 27 are open when it is desired to supply material from the supply line 17 to the interior of the container 10. If it also is desired to supply material from the supply line 17 to the discharge line 18 at the same time that the material is being supplied to the container 10, the valve 25 also is open.

While the compressor 22 on the delivery truck 20 supplies pressurized air to move the material from the container 19 on the truck 20 into the container 10 and the hopper 26, one or more of the valves 34 may be opened to allow pressurized air to be introduced into the line 16 to aid in conveying the material along the line 16 into the container 10. Furthermore, one or more of the valves 41 also may be opened to allow pressurized air to be introduced into the discharge line 18, if the valve 25 is open, to aid in transporting the material through the discharge line 18.

Since the valve 32 is closed, air from the compressor 29 is not introduced into the container 10 during supply of the material thereto from the supply line 17. Furthermore, the valve 28 is open to vent the container 10 so that the material entering the container 10 from the line 16 does not have to overcome any pressure other than atmospheric pressure.

When the container 10 is filled or the container 19 on the truck 20 is empty, the valve 23 in the supply line 17 is closed and the valve 25 in the discharge line 18 is closed if it has been open. The valves 24 and 36 are then opened and the valve 27 remains open so that pressurized air may flow from the line 31 through the line 16 to remove any material therefrom. This prevents any clogging or blocking of the line 16. Any material, which is in the line 16, is directed by the air into the container 10 through the inlet 14. The valves 34 are preferably left open during this clearing operation of the line 16. Of course, the valve 41 is closed when the valve 25 is closed.

If desired, the valve 25 need not be closed when filling of the container 10 is completed. In this manner, the discharge line 18 also would be cleared of any material therein after the supply line 17 has been blocked by closing of the valve 23.

After the line 16 has been cleared, the valves 24, 27, and 36 are closed. Likewise, the valves 34, if they remained open, also are closed. Similarly, if the discharge line 18 is cleared when the line 16 is cleared, then the valves 25 and 41 are closed. The compressor 29 may then be turned off if desired.

When it is desired to fill the hopper 26 from the container 10, the valves 16', 24, and 32 are opened. Opening of the valve 32 allows the compressor 29 to supply pressurized air to the top or inlet end of the container 10 to urge the material within the container 10 therefrom through the outlet 15 into the line 16. Since the valves 16' and 24 have been opened, the material will flow through the line 16 from the outlet 15 of the container 10. The valve 27 remains closed while the valve 25 is opened so that flow of the material through the line 16 is diverted therefrom into the discharge line 18 from which it passes into the hopper 26.

One or more of the valves 34 is opened to permit pressurized air to flow from the line 31 into the line 16. This supplemental air aids in moving the material along the line 16. Additionally, the valve 41 is opened to supply supplemental air to the discharge line 18. This aids in moving the material along the discharge line 18 into the hopper 26. The volume of air that will be supplied as a supplement to the line 16 and the discharge line 18 depends upon the material being transported therethrough and the length of each of the lines.

When the desired amount of material is supplied to the hopper 26, the valve 32 is closed to stop pressurizing of the container 10 so that there is no longer pressure forcing the material from the container 10 through the outlet 15 into the line 16. At the same time, the valve 25 is closed to block the discharge line 18. Furthermore, the valve 16' is closed to block communication of the outlet 15 with the line 16.

It should be understood that the valve 36 remains closed during transfer of material from the container 10 to the hopper 26. As soon as transfer of material from the container 10 to the hopper 26 is completed, the valve 36 is opened to allow pressurized air to pass through the check valve 38 into the line 16 to clear the line 16 of any material remaining therein. At the same time, the valve 27 is opened to allow the material, which is being cleared from the line 16, to return to the container 10. The valves 34 may be left open during this process to aid in clearing the line 16.

If it should be deemed feasible or desirable to also clear the discharge line 18, then the valve 25 would be left open. Thus, part of the air would be diverted from the line 16 through the discharge line 18 so that a portion of the material also would flow therethrough into the hopper 26 during this clearing operation. If the valve 25 is left open during clearing of the line 16 so that the discharge line 18 also could be cleared, then the valve 41 also would be preferably left open to provide supplemental air to the discharge line 18.

After the line 16 has been cleared, the valves 24 and 27 are closed. Likewise, the valves 34 in the lines 33 are closed. Furthermore, the valve 36 in the line 31 is closed. If the discharge line 18 also is cleared, the valves 25 and 41 also are closed.

When the clearing operation is completed, the line 16 no longer has any material therein so that it may not be blocked or clogged. Thus, the line 16 is ready to receive more material therethrough whenever it is desired to either replenish the supply of material within the container 10 or to transfer material from the container 10 to the hopper 26.

While the compressors 22 and 29 have been described as supplying air under pressure, it should be understood that any suitable gas may be employed if desired. The valves, which are selectively opened and closed, may be operated manually, by gas such as air, or by electrical means such as solenoids, for example.

Any type of powdered material may be transported by the material handling apparatus of the present invention. One powdered product is a filler, which is formed of particles capable of passing through a —200 mesh, for use as an additive to asphalt. Other examples of powdered products, which may be transported by the present invention, include concrete, cement, flour, and rice. Furthermore, certain liquid materials, which have a very low viscosity, also may be conveyed or transported by the present invention. In order to transport these materials, the maximum required pressure within the container 10 is fifty pounds per square inch. The minimum satisfactory pressure within the container 10 for conveying material therefrom to the hopper 26 is eight pounds per square inch.

While only one hopper has been shown connected to the discharge line 18, it should be understood that a plurality of branch lines could extend therefrom to a plurality of hoppers if desired. Of course, each of the branch lines would have one of the valves 25 therein.

An advantage of this invention is that a relatively low pressure may be employed in the storage container. Another advantage of this invention is that both the storage container and a mixing or weighing hopper or the like may be simultaneously supplied material from a suitable source. A further advantage of this invention is that it reduces the down-time of any hopper that is connected to the storage container. Still another advantage of this invention is that it eliminates blocking or clogging of any of the lines through which the material is transported or conveyed. A still further advantage of this invention is that loss of material is eliminated because a completely closed system is employed.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A pneumatic material handling system including a storage container, a discharge line communicating with said storage container, means to simultaneously supply material at full flow to said storage container and said discharge line from a source of material, said simultaneous supply means supplying material directly to said discharge line from the source of material without passing through said storage container, and means to supply material from said storage container to said discharge line when said simultaneous supply means is inactivated.

2. A pneumatic material handling system including a storage container, a discharge line communicating with said storage container, means to simultaneously supply material at full flow to said storage container and said discharge line from a source of material, said simultaneous supply means supplying material directly to said discharge line from the source of material without passing through said storage container, means to supply material from said storage container to said discharge line when said simultaneous supply means is inactivated, and means to maintain said storage container under pressure only when said last mentioned means is activated.

3. A material handling apparatus including a storage container having an inlet and an outlet, a first line having one end connected to said inlet and its other end connected to said outlet, a discharge line connected to said first line, means to supply material at full flow to said storage container and said discharge line through said first line, means to vent said storage container when material is supplied thereto by said supply means, means to pressurize the interior of said storage container to direct material from said storage container through said outlet and said first line to said discharge line when said supply means is inactivated, and means to clear said first line of material therein when material is no longer flowing therethrough.

4. A material handling apparatus including a storage container having an inlet and an outlet, a first line having one end connected to said inlet and its other end connected to said outlet, a discharge line connected to said first line, means to supply material at full flow to said storage container and said discharge line through said first line, means to vent said storage container when material is supplied thereto by said supply means, means to pressurize the interior of said storage container to direct material from said storage container through said outlet and said first line to said discharge line when said supply means is inactivated, and means to clear said first line of material therein when material is no longer flowing therethrough by admitting pressurized gas to said first line adjacent its connection to said outlet.

5. A material handling apparatus including a storage container having an inlet and an outlet, a first line having one end connected to said inlet and its other end connected to said outlet, a supply line connected to said first line and adapted to be connected to a source of material under pressure, a discharge line connected to said first line, first means to control flow of material through said supply line to said first line, second means to control flow of material from said first line through said discharge line, third means to control flow of material through said first line between said supply line and one of the ends of said first line, fourth means to control flow of material through said first line between said discharge line and the other end of said first line, means to vent said storage container when said first control means is open and one of said third and fourth control means is open and the other is closed whereby material may be supplied through said inlet to said storage container from said supply line, means to supply gas under pressure to the inlet end of said storage container only when said first control means is closed, said second control means is open, and one of said third and fourth control means is open and the other is closed whereby material is directed from said storage container through said outlet and said first line to said discharge line, and means to supply gas under pressure to said first line adjacent its connection to said outlet of said storage container only when said first control means is closed and said third control means and said fourth control means are open to clear said first line of material therein.

6. The apparatus according to claim 5 including means to supply gas under pressure to said discharge line when said second control means is open to aid in directing material through said discharge line.

7. A material handling apparatus including a storage container having an inlet and an outlet, a first line having one end connected to said inlet and its other end connected to said outlet, a supply line connected to said first line and adapted to be connected to a source of material under pressure, a discharge line connected to said first line, first means to control flow of material through said supply line to said first line, second means to control flow of material from said first line through said discharge line, third means to control flow of material through said first line between said supply line and one of the ends of said first line, fourth means to control flow of material through said first line between said discharge line and the other end of said first line, means to vent said storage container when said first control means is open and one of said third and fourth control means is open and the other is closed whereby material may be supplied through said inlet to said storage container from said supply line, means to supply gas under pressure to said first line between said supply line and said discharge line when at least one of said third and fourth control means is open, means to supply gas under pressure to the inlet end of said storage container only when said first control means is closed, said second control means is open, and one of said third and fourth control means is open and the other is closed whereby material is directed from said storage container through said outlet and said first line to said discharge line, and means to supply gas under pressure to said first line adjacent its connection to said outlet of said storage container only when said first control means is closed and said third control means and said fourth control means are open to clear said first line of material therein.

8. The apparatus according to claim 7 wherein said means supplying gas under pressure to said first line between said supply line and said discharge line includes means to vary the volume of gas supplied.

9. The apparatus according to claim 7 including means to supply gas under pressure to said discharge line when said second control means is open to aid in directing material through said discharge line.

10. The apparatus according to claim 8 including means to supply gas under pressure to said discharge line when said second control means is open to aid in directing material through said discharge line.

11. A material handling apparatus including a storage container having an inlet and an outlet, a first line having one end connected to said inlet and its other end connected to said outlet, a supply line connected to said first line and adapted to be connected to a source of material under pressure, a discharge line connected to said first line, first means to control flow of material through said supply line to said first line, second means to control flow of material from said first line through said discharge line, third means to control flow of material through said first line between said supply line and one of the ends of said first line, fourth means to control flow of material through said first line between said discharge line and the other end of said first line, means to vent said storage container when said first control means is open and one of said third and fourth control means is open and the other is closed whereby material may be supplied through said inlet to said storage container from said supply line, a compressor, a line connecting said compressor to the inlet end of said storage container, and means to allow pressurized gas to flow through said line from said compressor into said storage container only when said first control means is closed, said second control means is open, and one of said third and fourth control means is open and the other is closed whereby material is directed from said storage container through said outlet and said first line to said discharge line.

12. A material handling apparatus including a storage container having an inlet and an outlet, a first line having one end connected to said inlet and its other end connected to said outlet, a supply line connected to said first line and adapted to be connected to a source of material under pressure, a discharge line connected to said first line, first means to control flow of material through said supply line to said first line, second means to control flow of material from said first line through said discharge line, third means to control flow of material through said first line between said supply line and one of the ends of said first line, fourth means to control flow of material through said first line between said discharge line and the other end of said first line, means to vent said storage container when said first control means is open and one of said third and fourth control means is open and the other is closed whereby material may be supplied through said inlet to said storage container from said supply line, a compressor, a line connecting said compressor to the inlet end of said storage container, means to allow pressurized gas to flow through said line from said compressor into said storage container only when said first control means is closed, said second control means is open, and one of said third and fourth control means is open and the other is closed whereby material is directed from said storage container through said outlet and said first line to said discharge line, a gas line connecting said compressor with the end of said first line adjacent the connection of said first line to said outlet of said container, means in said gas line to control flow of pressurized gas from said compressor through said gas line, and means to allow flow of gas only from said gas line to said first line, said gas line control means being open only when said first control means is closed and said third control means and said fourth control means are open to clear said first line of material therein.

13. The apparatus according to claim 12 including at least one line connecting said gas line with said first line, means in said connecting line to control flow of gas from said gas line to said first line and to allow flow of gas only from said gas line to said first line, and said connecting line being connected to said gas line between said compressor and said gas line control means.

14. The apparatus according to claim 12 including at least one line connecting said gas line with said discharge line, means in said connecting line to control flow of gas from said gas line to said first line and to allow flow of gas only from said gas line to said first line, and said connecting line being connected to said gas line between said compressor and said gas line control means.

15. The apparatus according to claim 13 including at least one line connecting said gas line with said discharge line, means in said connecting line to control flow of gas from said gas line to said first line and to allow flow of gas only from said gas line to said first line, and said connecting line being connected to said gas line between said compressor and said gas line control means.

16. A pneumatic material handling system including a storage container, a discharge line communicating with said storage container, means to simultaneously supply material at full flow to said storage container and said discharge line from the source of material, means to supply the material from said storage container to said discharge line when said simultaneous supply means is inactivated, and means to supply gas under pressure to the interior of said storage container only when said last mentioned means is activated to maintain said storage container under pressure.

17. A material handling apparatus including a storage container having an inlet and an outlet, a first line having one end connected to said inlet and its other end connected to said outlet, a discharge line connected to said first line, means to simultaneously supply material at full flow to said storage container and said discharge line through said first line from a source of material, and means to supply material from said storage container through said outlet and said first line to said discharge line when said simultaneous supply means is inactivated.

18. The apparatus according to claim 16 including means to clear said first line of material therein when material is no longer flowing therethrough.

References Cited by the Examiner
UNITED STATES PATENTS

| | | | |
|---|---|---|---|
| 1,171,286 | 2/1916 | Wadsworth | 302—55 |
| 1,181,338 | 5/1916 | Newcomb | 302—28 |
| 1,616,547 | 2/1927 | Pontoppidan | 302—53 |
| 1,887,733 | 11/1932 | Sablik | 302—55 |
| 1,935,843 | 11/1933 | Goebels | 302—53 |
| 2,688,517 | 9/1954 | Riordan | 302—28 |
| 2,688,518 | 9/1954 | Krenke | 302—28 |

ANDRES H. NIELSEN, *Primary Examiner.*